Figures 5, 12, 13:
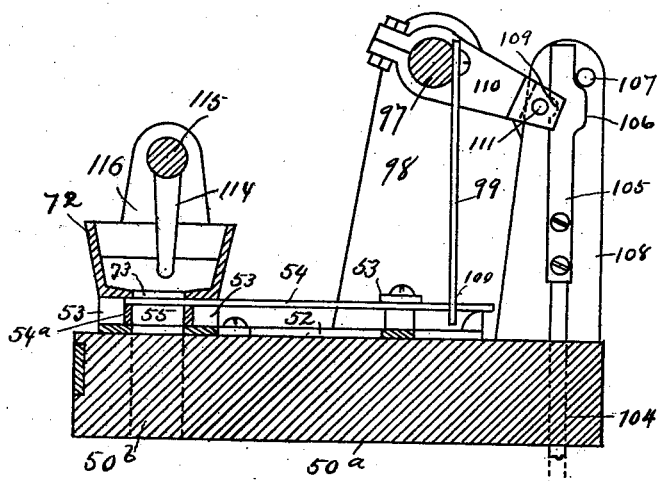

No. 689,634. Patented Dec. 24, 1901.
T. CARNEY.
GRAIN DRILL OR SEEDER.
(Application filed June 21, 1901.)
(No Model.) 5 Sheets—Sheet 1.
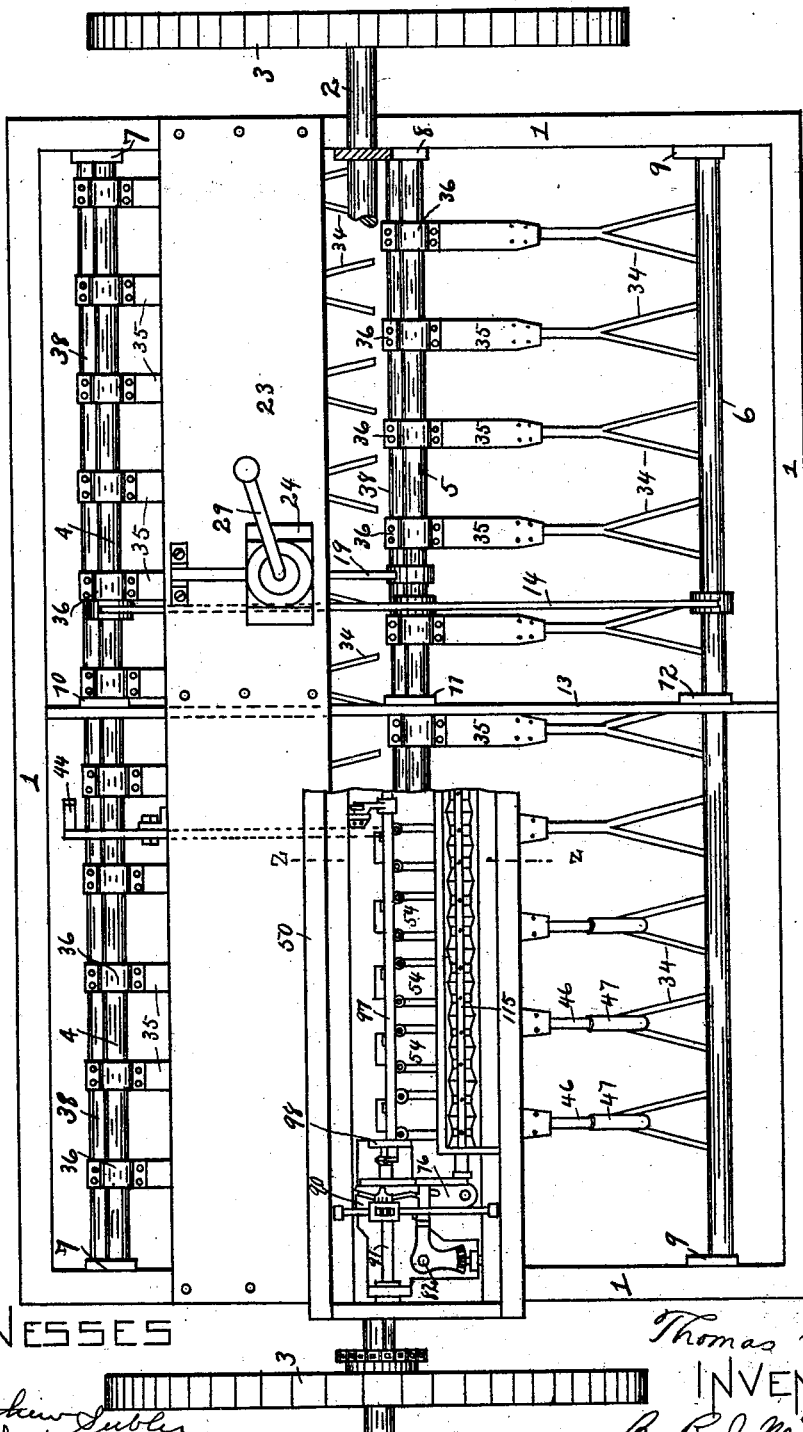

No. 689,634. Patented Dec. 24, 1901.
T. CARNEY.
GRAIN DRILL OR SEEDER.
(Application filed June 21, 1901.)
(No Model.) 5 Sheets—Sheet 2.
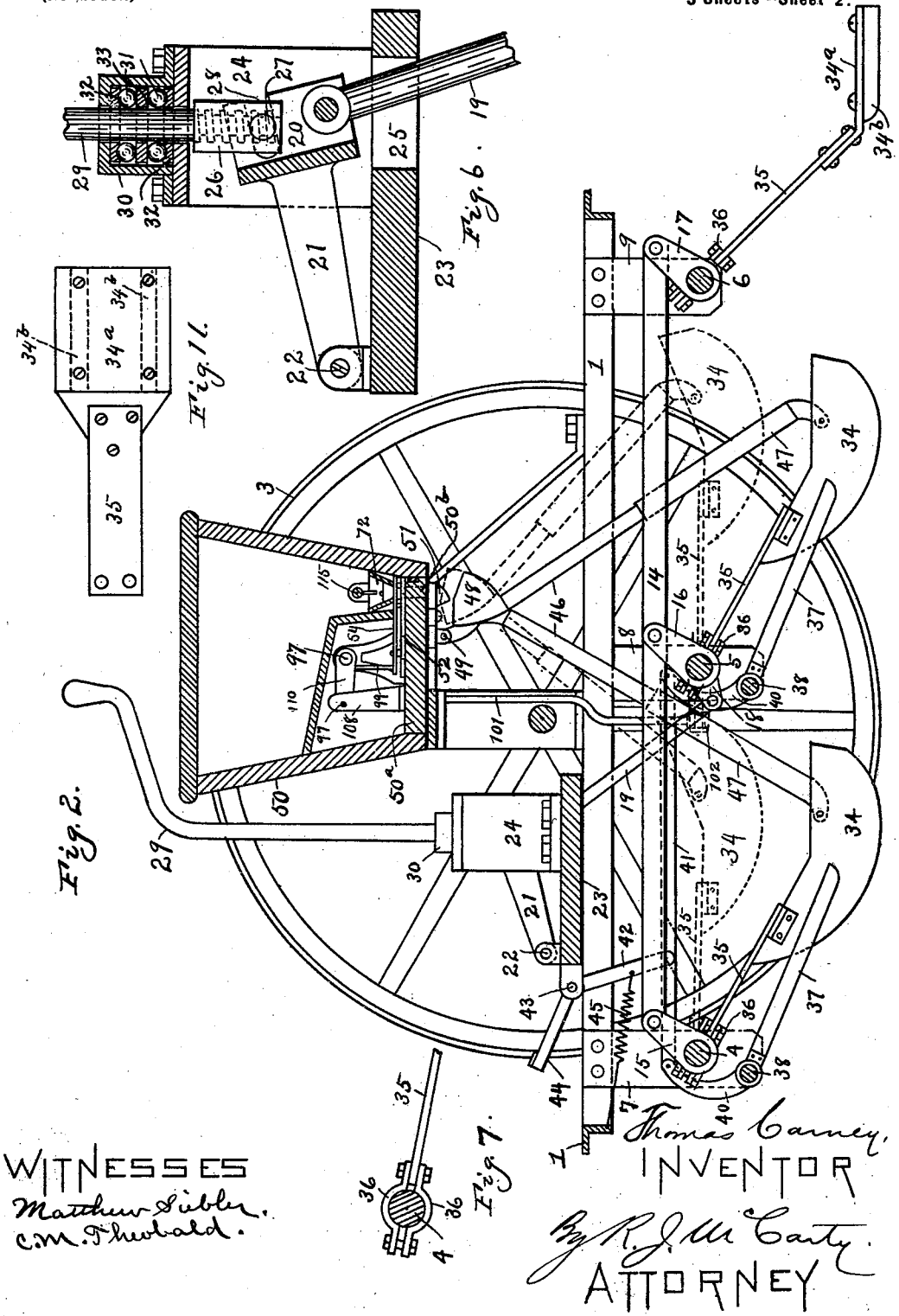
WITNESSES
Matthew Sibler
C. M. Theobald
INVENTOR
Thomas Carney
By R. J. McCarty
ATTORNEY No. 689,634. Patented Dec. 24, 1901.
T. CARNEY.
GRAIN DRILL OR SEEDER.
(Application filed June 21, 1901.)
(No Model.) 5 Sheets—Sheet 3.
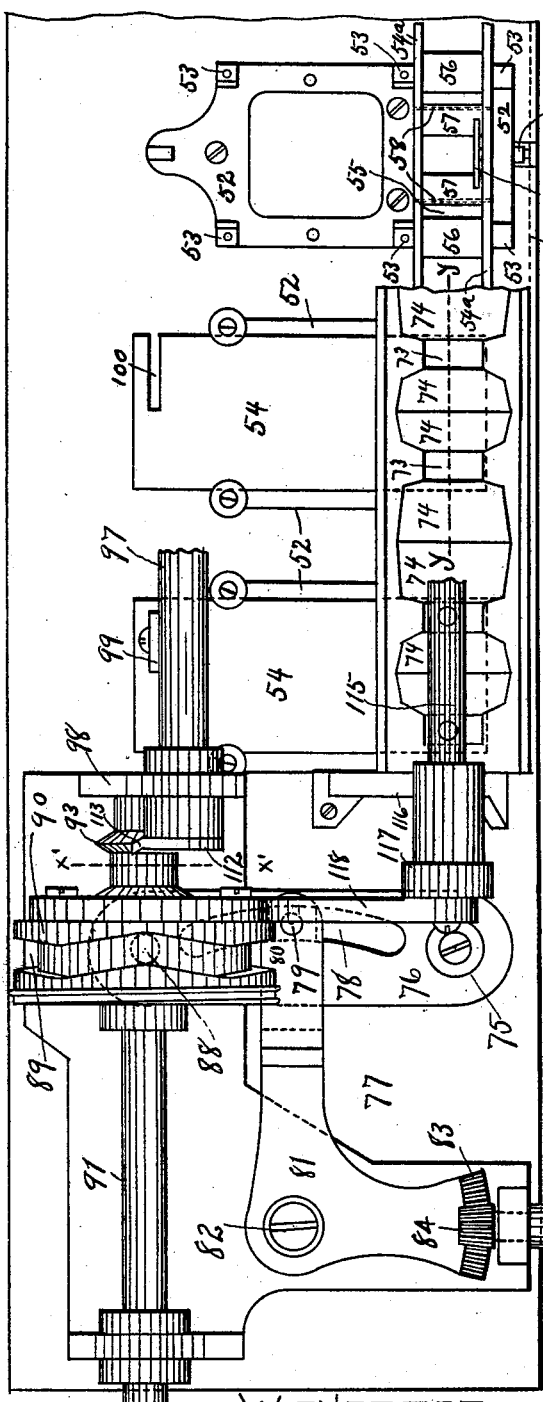
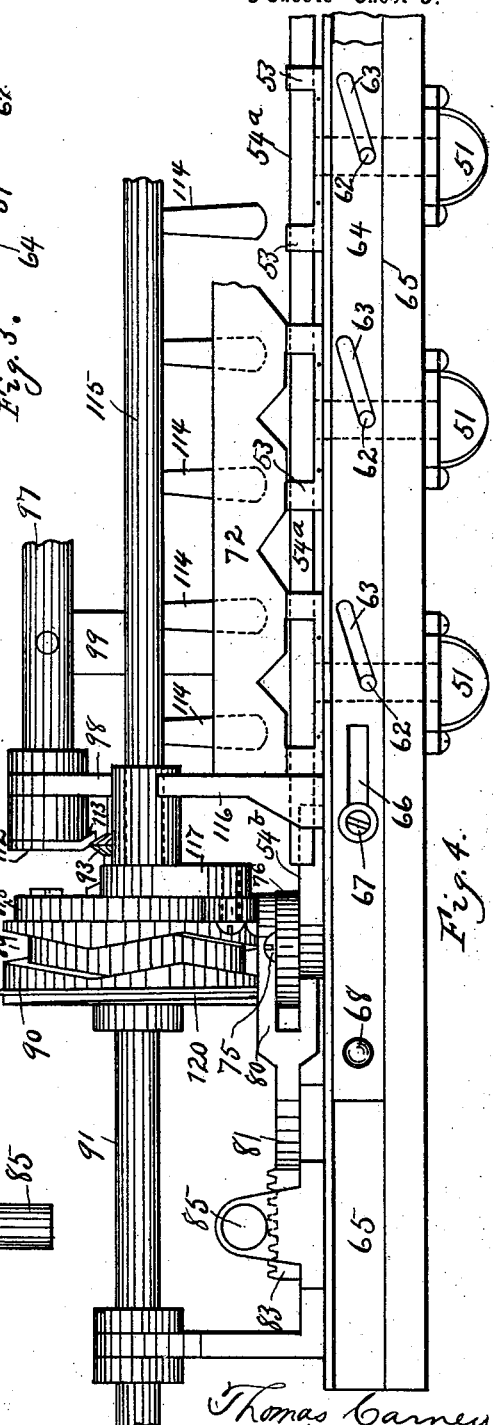
WITNESSES.
C. M. Theobald.
Matthew Siebler.
Thomas Carney
INVENTOR.
By R. J. McCarty
ATTORNEY.

No. 689,634.

Patented Dec. 24, 1901.

T. CARNEY.
GRAIN DRILL OR SEEDER.
(Application filed June 21, 1901.)

(No Model.)

5 Sheets—Sheet 4.

WITNESSES.
Matthew Siebler
C. M. Theobald.

INVENTOR.
Thomas Carney
By R. J. McCarty
ATTORNEY.

No. 689,634. Patented Dec. 24, 1901.
T. CARNEY.
GRAIN DRILL OR SEEDER.
(Application filed June 21, 1901.)
(No Model.) 5 Sheets—Sheet 5.
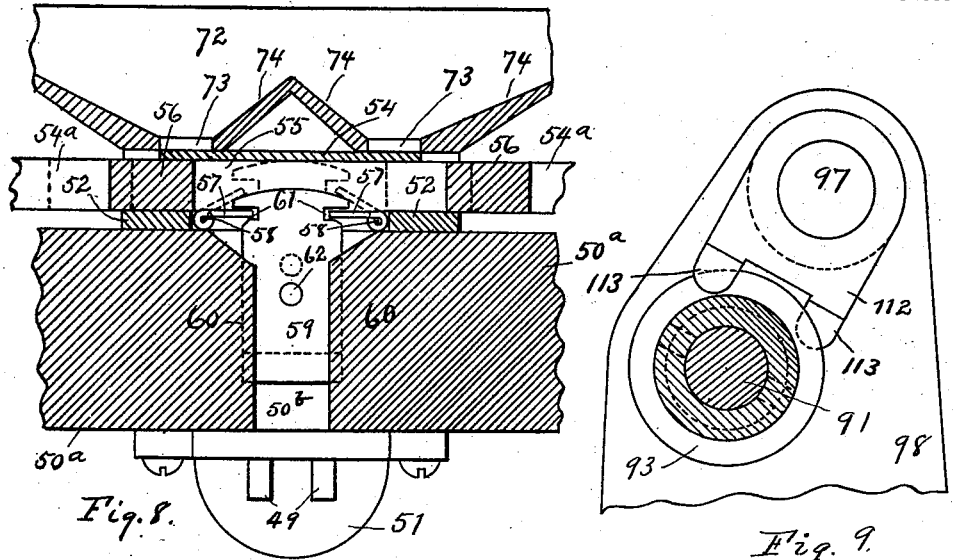
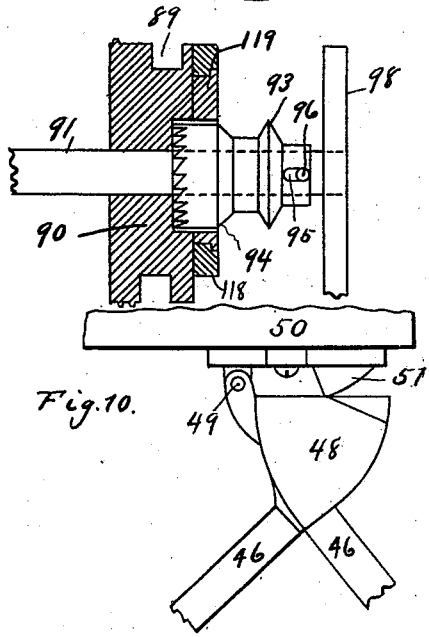
WITNESSES
Matthew Siebler.
C. M. Thielah.
INVENTOR
Thomas Carney.
By R. J. M. Carty,
ATTORNEY.

UNITED STATES PATENT OFFICE.

THOMAS CARNEY, OF DAYTON, OHIO.

GRAIN-DRILL OR SEEDER.

SPECIFICATION forming part of Letters Patent No. 689,634, dated December 24, 1901.

Application filed June 21, 1901. Serial No. 65,392. (No model.)

*To all whom it may concern:*

Be it known that I, THOMAS CARNEY, a citizen of the United States, residing at Dayton, in the county of Montgomery and State of Ohio, have invented certain new and useful Improvements in Grain-Drills or Seeders; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to grain-drills or seeders, and comprises certain improvements in the grain-drill shown and described in my Patent No. 681,037, granted August 20, 1901.

The improvements to be hereinafter described and claimed comprise the feed mechanism, means for agitating the grain during the operation of sowing the same, and means for manipulating the various gangs of grain-shoes, and other improvements hereinafter described and claimed.

Preceding a detail description of my invention reference is made to the accompanying drawings, of which—

Figure 1 is a top plan view with part of the grain-hopper and feed mechanism broken away. Fig. 2 is a longitudinal sectional view of my improved seeder. Fig. 3 is an enlarged top plan view of a portion of the grain-feeding mechanism, parts of which are broken away. Fig. 4 is a front elevation of Fig. 3. Fig. 5 is a detail view of the scales which regulate the sowing of grain. Fig. 6 is a detail sectional elevation of the mechanism for elevating and lowering the gangs. Fig. 7 is a detail view showing the manner of attaching the grain-shoes to their respective shafts. Fig. 8 is a sectional view of the grain-feeding mechanism on the line $y\ y$ of Fig. 3. Fig. 9 is a sectional view on the line $x'\ x'$ of Fig. 3. Fig. 10 is a sectional view of the main cam-wheel and clutch shown in Fig. 3. Fig. 11 is a plan view of the upper side of one of the furrow-coverers. Fig. 12 is a section of the cut-off mechanism on the line $z\ z$ of Fig. 1, the sides of the seedbox not appearing. Fig. 13 is a detail view of the shoe-scraping devices.

In a detail description of my invention similar reference characters indicate corresponding parts throughout the several views of the drawings.

1 designates the main carrying-frame, which is mounted on axles 2, that are journaled in said frame and upon which axles the wheels 3 are mounted. Within said frame there are journaled three parallel shafts 4 5 6, the ends of which are mounted in brackets or hangers 7 8 9, which are secured to the ends of the frame. These shafts 4 5 6 are supported near their centers in hangers 10 11 12, which depend from a transverse bar 13, which is mounted in the frame. By this arrangement of the gangs of shoes it will be seen that there is an intervening space between the shoes of the forward gang and those of the rearward gang, which enables the furrows to be made four inches apart and yet a suitable space maintained between the respective shoes of each gang, so that any clogging up of the space between the shoes is avoided, as is fully shown and described in my former patent hereinbefore referred to.

14 is a horizontal sliding and connecting bar which is adapted to be moved back and forth in a manner hereinafter described. This bar 14 will impart oscillating movements simultaneously to the shafts 4 5 6, to which it is connected by cranks 15 16 17, the said cranks having pivotal connections with the sliding bar 14 and rigid connections with the shafts. This bar 14, it will be seen from Figs. 1 and 2, forms a common connection between the shafts 4 5 6.

I will now describe the means for simultaneously elevating or lowering said shafts, reference being made to Figs. 1 and 2. 18 designates a crank or arm rigidly connected to the central shaft 5. Pivoted to this crank 18 is a link-lever 19, which extends obliquely therefrom and has a pivotal connection at its upper end between the sides of the head 20, (see Fig. 6,) which is an integral part of a lever 21, the latter having a fulcrum at 22 on the board 23, which extends from end to end of the machine. The lever-head 20 is inclosed in a housing or box 24, which is rigidly mounted above the opening 25 in the board 23, the said opening permitting the link-lever 19 to have the necessary movement. 26 is a screw-socket which has a loose connection with the head 20 by means of trunnions 27, which project from opposite sides of said screw-socket and fit in open slots 28 in the sides of said head 20. 29 is a crank or turn rod, the lower end of which is screw-threaded to enter the screw-socket 26. This shaft passes through a ball-housing 30, which is secured to the top of the box 24. Within said housing there are located two sets of ball-bearings 31, which are inclosed between plates 32 and 33, the latter plates—to wit, 33—having a rigid connection with the crank-shaft 29 and the plates 32 having a rigid connection with the boxes 24 and 30. (See Fig. 6.) It will thus be seen that by turning the crank-shaft 29 the lever 21 will be actuated upon its fulcrum 22 to elevate or lower the shaft 5 through the connecting-links 19 and 18 and shafts 4 5 6, being all connected as hereinbefore specified by the connecting-bar 14. All of said shafts will thus be operated from the movement imparted to the crank-rod 29. The ball-bearings render this operation comparatively easy, so that the gangs on shafts 4 5 6 may be easily manipulated. Shaft 6 supports a series of furrow-coverers 34ª, which throw the soil from both sides of the furrow. These furrow-coverers are attached to the shaft by spring-bars 35 and clips 36 similar to the manner of attaching the shoes. The lower surface of said coverers is provided with two ribs 34ᵇ, which confines the loose soil in a manner to completely cover the furrow, one of said ribs being on each side of the furrow. (See Figs. 2 and 11.) The drill-shoes 34 are arranged in two gangs substantially in the manner shown and described in my patent hereinbefore referred to. Each shoe has a connection with its respective shaft 4 and 5 by means of a suitably-resilient bar 35, which is secured between clamps 36, which surround said shafts, as shown in Fig. 7. 37 designates scrapers which lie against the sides of the shoes and are mounted on shafts 38, said shafts 38 being journaled in the hangers 7 and 8. The shafts 38 also have rigidly connected to them links 40, the upper ends of which are pivoted to a horizontal bar 41. Also pivoted to the forward portion of said bar 41 is a connecting-link 42, which has a pivotal connection at 43 and terminates in a foot-pedal 44. The said scrapers are maintained in a normal position by means of a spring 45, and they are operated by pressing upon the pedal 44. 46 and 47 designate two series of telescopic feed-chutes or feed-tubes which project between the sides of the shoes 34 and have at their upper ends cups 48, which have pivotal connections at 49, one of said connections being clearly shown in Fig. 2. It will be understood that these connections are in line with each other and are made at the bottom of the seed-box 50. 51 designates a series of spouts which are attached to the bottom 50ª of the hopper below the openings 50ᵇ therein and above the cups 48. One of these openings 50ᵇ appears in dotted lines, Fig. 2.

I will next describe the feed mechanism by means of which any grain—such, for example, as wheat, oats, clover, millet, flax, grass-seed, barley, and in fact any kind of grain—may be handled and fed in suitable quantities. This mechanism is clearly illustrated in Figs. 1, 2, 3, 4, 8, and 12 of the drawings. 52 designates a series of base-plates which are secured to the bottom 50ª of the seedbox, Fig. 3. These base-plates 52 are above the openings 50ᵇ and have a series of guide-lugs 53 on the upper surface thereof, which guide a series of cut-offs 54. They also guide the reciprocating bar 54ª. This bar 54ª extends the entire length of the seedbox, or approximately so, and a series of openings 55 is provided therein by joining said bar throughout its length with distance-strips 56. Said bar 54ª lies immediately above the base-plates 52, and the openings therein are above the openings in said base-plates and the openings in the seedbox, as is clearly shown in Fig. 8. 57 designates a series of wings or blades pivoted at 58 to opposite sides of the guide-plates 52. These wings 57 are all adjusted simultaneously from the horizontal positions shown in full lines in Fig. 8 to the inclined positions shown in dotted lines. The adjustments are obtained by means of plates 59, which are mounted in grooves or ways 60, provided in the bottom 50ª of the seedbox. The upper ends of said plates 59 are provided with notches 61, into which the edges of the wings 57 project, and as said plates 59 are shifted upwardly and downwardly the positions of the wings 57 are varied, as shown in full and dotted lines in Fig. 8. Projecting from each plate 59 is a stud 62, that projects into one of the oblique slots 63 in a shifting-bar 64, the said shifting-bar being mounted on the front side of the bottom of the seedbox. (See Fig. 4.) A way or guide 65 is provided in said bottom in which the said shifting-bar 64 is mounted. The said bar 64 is moved the extent of a series of longitudinally-disposed slots 66, through which headed studs 67 project and enter the bottom of the seedbox. 68 designates a stud or finger-piece secured to an end of said shifting-bar and projecting through a slot 69 in the rear side of the seedbox. (See Fig. 5.) This stud 68 is provided with a pointer 70, which points to a scale 71 on the rear side of the seedbox, by means of which the extent of movement to be imparted to the wings 57 is ascertained. For example, in sowing wheat these wings should be but slightly elevated from their lower positions, as is shown in Fig. 8. In sowing clover, millet, or flax they should be elevated to their limit, as indicated in dotted lines, the object of the wings being to retard the movement of such grain as have a smooth surface, also to enable the sowing of the required amount of grain.

In other words, the passage of the grain through the feed-openings 50ᵇ can be regulated as required by means of these devices. In operating the machine the said wings are first adjusted to their proper position by shifting the pointer 70 to the proper points on the scale 71, as shown in Fig. 5. The machine is then started. The reciprocating feed-plate 54ᵃ is vibrated transversely to move the grain from each side up and over the wings 57. 72 designates a grain-hopper which is mounted above the vibrating plate 54ᵃ. The cut-offs 54 move between the bottom of the grain-hopper 72 and the top of the vibrating plate 54ᵃ, as will be seen in Fig. 8. The said grain-hopper is provided throughout its length with a series of grain-openings 73, on either side of which are inclined surfaces 74, which direct the grain to the openings 73.

I will now describe the means for operating the bar 54ᵃ and the cut-offs 54. Referring to Figs. 3 and 4, an extended end 54ᵇ of said bar 54ᵃ is pivoted at 75 to an end of an adjusting-lever 76. This adjusting-lever lies on a suitable plate or base 77 in an end of the seedbox and has a curved slot 78 therein, through which projects a pin 79, the said pin 79 being attached to the bifurcated end 80 of a bell-crank lever 81, which straddles the adjusting-lever 76, which has its fulcrum at 82. The pin or stud 79 forms a changeable fulcrum for the lever 76, which is due to the fact that the bell-crank lever 81 may be shifted to change the position of the stud 79 by means of gear-teeth 83, which mesh with a pinion 84, the said pinion being on a stud-shaft 85, which projects through the rear wall of the seedbox and has a pointer 86, which is moved in an arc to various points of a scale 87. (See Fig. 5.) By means of this mechanism the extent of movement to be imparted to the vibrating feed-bar 54ᵃ is ascertained. The movement is imparted to the lever 76 from a stud 88, which projects therefrom and enters a cam-slot 89 on wheel 90, the said wheel 90 being loose on a driving-shaft 91, which has a chain-wheel 92, said chain-wheel 92 being driven from one of the axles of the driving-wheels in a well-known manner. It will therefore be clearly understood that in the rotation of the wheel 90 the cam-slot 89 therein will cause a reciprocating movement of the lever 76. This movement will be imparted to the feed-bar 54ᵃ, and, as before stated, the extent of the movement imparted to said feed-bar may be regulated by shifting the fulcrum 79 thereof. On the shaft 91 there is a bevel-wheel 93, which is of the construction clearly shown in Figs. 3, 9, and 10, and integral with which is one member of a clutch 94, the other member of said clutch being in the wheel 90. This clutch, consisting of the parts 93 94, rotates continuously with the shaft 91, but may have some longitudinal movement thereon by means of the oblong slot 95, which receives a stud 96, that projects from said shaft 91. 97 is an oscillating shaft extending throughout the length of the seedbox and the ends of which are mounted in standards 98 at suitable points. 99 designates a series of arms forming connections between this shaft 97 and the cut-off plates 54. One end of each of these arms or connections is rigidly attached to said cut-offs by means of slots 100 in the outer ends of said cut-offs. Through this mechanism the said cut-offs are operated in either direction to open or close the feed-openings by the rocking of the shaft 97, the clutch device (shown in Fig. 10) engaging or releasing wheel 90. The withdrawal or opening of the cut-offs 54 and the engagement of the clutch 94 with the wheel 90 are effected simultaneously with the lowering of the drill-shoes, and the movement of said cut-offs to close the feed-openings, and thereby shut off the feed of grain, and to disengage the clutch 94 with the wheel 90 is accomplished simultaneously with an elevation of the drill-shoes by means of the following mechanism:

Referring to Figs. 1, 2, 3, 4, and 12, 101 is an operating bar or rod having a suitable curvature in passing upwardly through the bottom of the seedbox at a central point thereof. This rod, as shown in Fig. 12, is connected with the central shaft 5 by means of a clamp 102, which has a longitudinal slot 103, with which a loose connection is made with the lower end of said rod 101. As the shaft 5 is rocked to lower or elevate the shoes movement is imparted to the rod 101, which is guided in the opening 104 in the bottom of the seedbox. 105 designates an adjustable portion of said rod. 106 is a cam-surface on said adjustable part, and 107 designates a stud projecting from a standard 108, the said standard 108 rising from the bottom of the seedbox. The adjustable part 105 of the rod 101 has also a recess 109, (shown in dotted lines in Fig. 12,) the said recess being on the side opposite the cam 106. 110 designates a rocker-arm, which has a pin or stud 111 projecting from the free end thereof. This arm 110 is clamped to the shaft 97, which, as before stated, has the cut-off arms 99 connected to it.

Referring to Fig. 8 it will be noticed that a cut-off 54 lies across the seed-openings 56, communicating with the grain-hopper 72. This is the case when the grain-shoes are elevated, as shown in dotted lines in Fig. 2. The operation of elevating the grain-shoes is accomplished through the handle 29, as hereinbefore stated. The screw on the lower end of said crank-handle is driven downwardly in the screw-socket 26. This causes an elevation of the lever 21, and therewith the connecting-link 19, which rocks the shaft 5 in the direction that causes a lowering of the rod 101, the stud or pin 111 having been in the recess 109 after the rod 101 has lowered the arm 110. The said operation of lowering arm 110 moves the cut-offs 54 in position shown in Fig. 12. When the grain-shoes are lowered in the ground, the rod 101 is moved upwardly.

The cam-surface 106 thereon engaging with the stud 107 moves the recess 109 to a position to receive the stud 111 on the arm 110. The continuing movement of the rod 101 rocks the shaft 97 to a sufficient extent to remove the cut-offs 54 out of or away from the seed-openings. This rocking movement of the shaft 97 in a direction that results in a closing of the grain-openings by the cut-offs also disengages the clutch 94 (see Figs. 3, 9, and 10) through the following means: On the end of the shaft 97 there is a plate 112, rigidly secured thereto. This plate has two projecting ends 113, which are turned in opposite directions and project on opposite sides of the bevel-wheel 93, making contact with the opposite surfaces of said wheel according to the movement to be imparted to the clutch devices 94. For example, when the rock-shaft 97 is rocked from shaft 5 through mechanism in Fig. 12 to move the cut-offs from over the feed-openings, one of the projecting ends 113 will come in contact with one of the bevel sides of the wheel 93 that is necessary to throw in the clutch 94, and when the operation of the shaft 97 takes place, which is necessary to open the seed-openings, the clutch devices are thrown out of gear with the wheel 90. It will therefore be understood that in operating the cut-offs 54 the driving cam-wheel 90 is also operated. The grain during the feed operation is agitated by a series of fingers 114, which project downwardly into the grain-hopper above the openings 73. These fingers or agitators have a movement very similar to the fingers on the hand—that is to say, they have a pendulum movement across each compartment. This pendulum or oscillating movement is imparted from a rock-shaft 115, to which said fingers are rigidly secured. The said rock-shaft is journaled at each end of the seed-hopper in suitable standards 116, and movement is imparted thereto by means of a crank 117, which is fast on said rock-shaft and to which a strap 118 is connected. The said strap 118 surrounds an eccentric 119, that is fast on the wheel 90. (See Figs. 3 and 4.)

Having described my invention, I claim—

1. In a grain-drill or seeder, the combination of gangs of drill-shoes mounted therein, one of said gangs being in the rear of the other, the point of attachment of the shoes of the rearward gang being in the rear of the rearward ends of the shoes of the forward gang, so that no portion of the shoes of the rearward gang will be in line with those of the forward gang, a common pivotal connection between the shafts of said gangs, a crank, pivotal connections between said crank and said gangs whereby the gangs of shoes may be elevated and lowered simultaneously, a series of scrapers for each of said gangs of shoes, and a common connection between the scrapers of each gang whereby both series of scrapers may be operated simultaneously.

2. In a grain-drill or seeder, gangs of drill-shoes, a common connection between the shafts of said gangs, a crank-handle, a lever adjacent to the lower end of said crank-handle, a flexible screw connection between the head of said lever and said crank-handle, a link forming a connection between the shaft of one of the gangs of drill-shoes and the head of said lever, whereby said gangs of drill-shoes may be simultaneously elevated and lowered by turning said crank-handle.

3. In a grain-drill or seeder, gangs of drill-shoes, a common connection between the shafts of said gangs, a crank-handle, a lever adjacent to the lower end of said crank-handle, a flexible screw connection between the head of said lever and said crank-handle, a link forming a connection between the shaft of one of the gangs of drill-shoes and the head of said lever, whereby the said gangs of drill-shoes may be simultaneously elevated and lowered by turning said crank-handle, a series of scrapers for each gang of shoes, a common connection between each series of scrapers, whereby the scrapers of each gang may be simultaneously actuated.

4. In a grain-drill or seeder, the combination with a seedbox having seed-openings therein, a series of telescopic feed-chutes pivotally connected below said openings, wings or plates mounted above said openings, and adapted, to retard the passage of grain to said openings, and means for changing the positions of said wings or plates as desired.

5. In a grain-drill or seeder, the combination with a seedbox having seed-openings therein, a series of telescopic feed-tubes connected below said openings, wings or plates mounted above said openings and adapted, to retard the passage of grain to said openings, means for changing the positions of such wings or plates as desired, and cut-offs controlling the passage of grain above said wings or plates.

6. In a grain-drill or seeder, the combination with a seedbox having grain-openings therein, pivotal wings or plates mounted above said openings and adapted, when elevated to retard the passage of grain to said openings, means for simultaneously adjusting said plates to desired positions, a vibrating feed-bar having seed-openings therein, the said bar being mounted above said pivotal wings or plates, and a seed-hopper mounted above said vibrating bar.

7. In a grain-drill or seeder, the combination with a seedbox having seed-openings therein, a series of base-plates mounted above said seed-openings, pivotal wings or plates mounted in said base-plates above said seed-openings, a vibrating feed-bar mounted and guided on said base-plates, and a seed-hopper mounted above said vibrating seed-bar and forming an upper guide therefor.

8. In a grain-drill or seeder, the combination with a seedbox having a series of grain-openings therein, pivotal wings mounted above said openings and adapted, to retard the passage of grain to said seed-openings, an actuating-plate to which said pivotal wings are connected, bars to which the actuating-plate of each set of wings is connected, and whereby said wings are simultaneously moved to vary their positions, substantially as and for the purposes specified.

9. In a grain-drill or seeder, the combination with a seedbox having grain-openings therein, means for retarding the passage of grain to said seed-openings, a series of cut-offs mounted above said openings, a shaft, connections between said shaft and said cut-offs whereby said cut-offs are simultaneously actuated to close or open the grain-passages, clutch mechanism actuated by said shaft and controlling the power which operates the feed mechanism, the motion of said shaft which stops the feed of grain also simultaneously cutting off the power from the feed mechanism and vice versa.

10. In a grain-drill or seeder, the combination with a seedbox having grain-openings therein, a vibrating feed-bar mounted above said grain-openings, means for actuating said feed-bar, a series of cut-offs controlling the passage of grain to said grain-openings, a shaft, a series of individual connections between said cut-offs and said shaft, clutch mechanism controlled by said shaft, the motion of said shaft which moves the cut-offs to positions to close the grain-openings, also actuates the clutch mechanism to cause a stoppage of the vibrating feed-bar.

11. In a grain-drill or seeder, the combination with a seedbox having grain-openings therein, of a vibrating feed-bar mounted above said grain-openings, a main driving-cam, means for transmitting motion therefrom to said vibrating feed-bar, a series of cut-offs controlling the grain-openings, a rock-shaft, connections between said rock-shaft and said cut-offs whereby said cut-offs are actuated, clutch mechanism controlling the main driving-cam, and means on said rock-shaft for engaging said clutch mechanism to move the driving-cam out of an operative position simultaneously with the closing of the grain-openings by the cut-offs and vice versa, substantially as specified.

12. In a grain-drill or seeder, the combination with gangs of drill-shoes, and a seedbox having seed-openings therein, of a vibrating feed-bar arranged above said grain-openings, a main driving-cam, means for transmitting the required motion from said cam to said feed-bar, a series of cut-offs controlling the passage of grain to the grain-openings in the seed-box, a rock-shaft, connections between said rock-shaft and the cut-offs, clutch mechanism interposed between said rock-shaft and the main driving-cam, means on said rock-shaft controlling the clutch mechanism, and means interposed between said rock-shaft and the gangs of drill-shoes, whereby, when the said gangs of drill-shoes are elevated, the rock-shaft will be actuated to simultaneously move the cut-offs above the grain-openings, and actuate the clutch mechanism to throw the main driving-cam out of operative relation with the vibrating feed-bar, substantially as specified.

In testimony whereof I affix my signature in presence of two witnesses.

THOMAS CARNEY.

Witnesses:
R. J. McCARTY,
J. A. WORTMAN.